March 27, 1934.  M. J. SPIVACK  1,952,340
PROCESS OF PRODUCING STEREOSCOPIC MOVING PICTURES
Filed Sept. 23, 1930  2 Sheets-Sheet 1
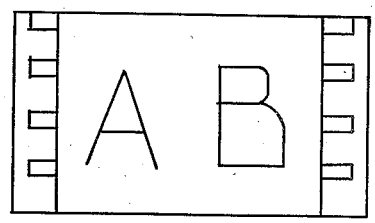
Fig.1.
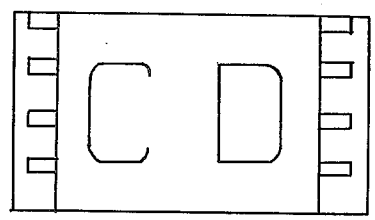
Fig.2.
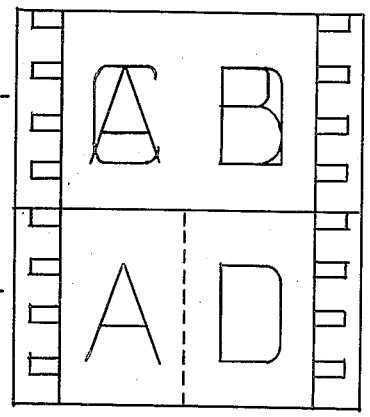
Fig.3.
Fig.4.
Inventor:
Morris J. Spivack.

March 27, 1934.  M. J. SPIVACK  1,952,340
PROCESS OF PRODUCING STEREOSCOPIC MOVING PICTURES
Filed Sept. 23, 1930  2 Sheets-Sheet 2
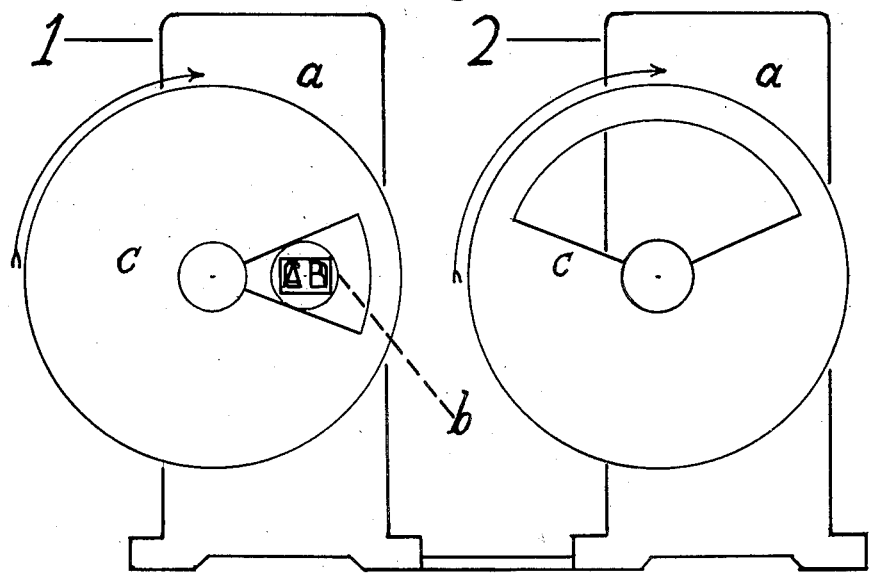
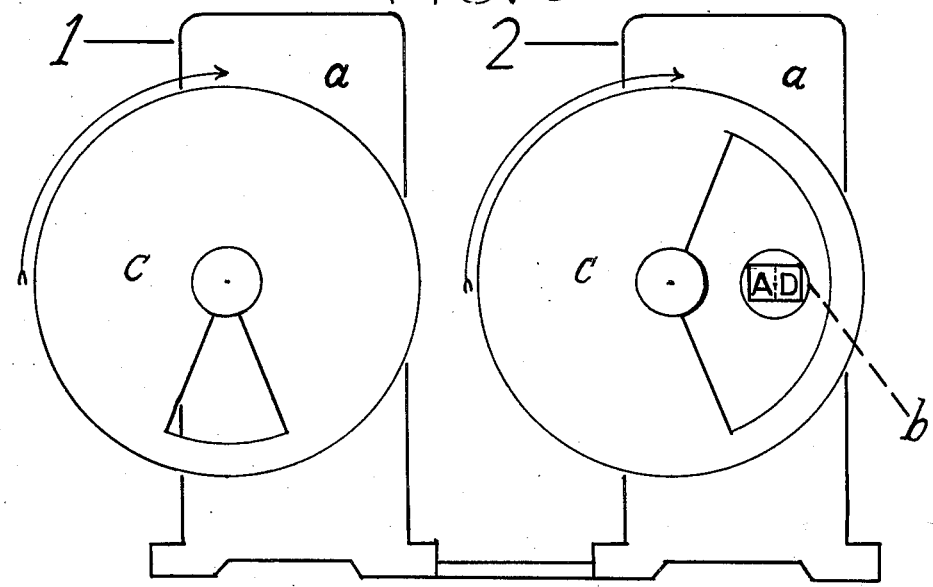
Inventor:
Morris J. Spivack Patented Mar. 27, 1934

1,952,340

UNITED STATES PATENT OFFICE 1,952,340

PROCESS OF PRODUCING STEREOSCOPIC MOVING PICTURES

Morris J. Spivack, Brooklyn, N. Y.

Application September 23, 1930, Serial No. 483,976

4 Claims. (Cl. 88—16.6)

This invention relates to the process of reproducing on an ordinary moving picture screen those optical sensations which in real life give the impression of depth and solidity or the third dimension, and particularly to the production of stereoscopic illusion by treating motion picture film by a new process originated by the inventor and hereby designated the "depth-preference" process.

The process of producing stereoscopic moving pictures claimed herein is based on a new theory of vision discovered by the inventor and never before recognized. The common description of binocular vision states that the pictures presented to the two eyes fuse into one. But no law stating exactly what the resultant picture must be under all conditions has ever been arrived at. In the opinion of this inventor, in all binocular vision, wherever the views seen by the two eyes conflict, those parts which represent a deeper view into the distance will remain while the parts in front (i. e., the transparent parts) will disappear. The complete adjustment, according to this inventor, is as follows: First—momentary double vision, second—the rejection (by the mind) of the nearer in favor of the deeper views.

The depth-preference process of producing stereoscopic moving pictures, claimed by this inventor, consists of the following steps:

1. Photograph the required scene from two separated viewpoints corresponding more or less to the distance between the eyes.

2. Working either with negatives or positives, whichever are preferred, treat the two films as follows:

(a) Place the left-hand film (film A) on top of the right-hand film (film B) and hold them over a strong light, examining them thus, frame by frame.

(b) Through a magnifying glass observe any important parts of the two films which do not coincide, especially the contours of large bodies.

(c) Using opaque black ink, paint out or erode all parts in film A which obstruct any parts in film B that represent greater depth into the scene.

(d) Now place film B on top of film A and paint out or erode those parts in film B which obstruct the parts in film A that represent greater depth into the scene.

(e) Print these two films in their changed form one on top of the other, obtaining thus the finished stereoscopic print.

3. Also make a simple double-vision, print by printing the original, untouched negatives A and B one on top of the other.

4. The method of projecting, using two projectors, is as follows:

(a) The stereoscopic print and the double vision print must alternate on the screen, that is—every frame in the corrected print must be preceded in projection by its corresponding frame in the double vision print.

(b) Each projector runs at normal speed required for flickerless vision.

(c) It is necessary to make the interval of darkness between every pair of alternating frames longer than the interval between the two which make up each pair, in order to isolate the pairs visually from each other.

Referring to the drawings:

Figure 1 represents a left-eye view of a single object photographed upon a frame of motion picture film.

Figure 2 represents a right-eye view of the same object photographed upon a frame of motion picture film.

Figure 3 represents the left and right-eye photographic views of a single object superimposed upon a frame of motion picture film.

Figure 4 represents a "depth-preference" film or print of a single object in which parts of the left and right-eye photographic views of the same object have been combined and recorded in accordance with the process described and claimed in this invention.

Figure 5 is a diagrammatic representation of two synchronized motion picture projectors with the first projector (1) throwing an image towards a screen while the projection lens of the second projector (2) is covered.

Figure 6 is a diagrammatic representation of the same two synchronized motion picture projectors with projector 2 throwing a related image toward the same screen, while the projection lens of projector 1 is covered.

It will be understood, then, that AB represents a left-eye view of a single object photographed upon a film; CD represents the right-eye view of the same object photographed upon another film simultaneously; AC—BD represents the two views superimposed one upon the other; AD represents the final, corrected, "depth-preference" film or print.

Due to the difference of the two viewpoints and the nature of stereoscopic vision, the left-eye view can always be assumed to show deeper parts on the left side of all objects, beyond what is seen at the same relative place in the right-eye view. These deeper parts are represented in AB by A. Similarly the right-eye view can always be assumed to show deeper parts on the right side of all objects, beyond what is seen at the same relative place in the left-eye view. These deeper parts are represented in CD by D.

Thus when the two views are superimposed one upon the other, as represented in AC—BD, C naturally obstructs A, while B naturally obstructs D.

The next step is to eliminate the foreground parts, B and C, in favor of the deeper parts, A and D, and printing the remaining parts together on one film, resulting in AD.

The dotted line in AD is an arbitrary line included simply to represent the intermediary parts of the object which coincide in both views and join the whole together.

Analyzing the drawings further, it will be noted that only the right-hand side of the object in the left-eye view required retouching, and inversely only the left-hand side of the object in the right-eye view required retouching. This difference is the natural result of the nature of the invention. In every attempt to carry out the laws of elimination set forth in step 2 of the specification this will unavoidably be found to be the case. It is merely pointed out here to make the drawings clearer.

This drawing has been simplified to show, by way of illustration, what happens to a single object in my process, but it represents the working of the process for all objects in all parts of a frame and in all the frames of a film, and, where an object is complicated, in all parts of the object which have relief.

In projection, the superimposed view, AC—BD, precedes the corrected view AD with which it alternates on the screen; it is also exposed for a shorter time than AD to meet the requirement of the specification for only "momentary double vision".

A detailed description of the "depth-preference" method of projection treated in (4), would be:

Project from one of the projectors a film on which a right-eye view and a left-eye view of the same scene are superimposed, and from the other projector a film on which a "depth-preference" picture has been printed, project the first film using a shutter which will expose the light only once for each frame for a shorter time than is usual, and project the second film immediately afterwards giving each frame in this the usual length of exposure, leaving a long interval of darkness after these two pictures, no less than the length of time required for both of them to be shown. This operation is repeated continuously.

Referring again to the drawings:

In Figures 5 and 6, "a" is the front plate of each projector; "b" is the projection lens of each projector; "c" is a shutter, or means of cutting off the light.

Within the projection lens of projector 1, in Figure 5, an image of Figure 3, or the double-vision film, AC—BD, is shown being projected.

Within the projection lens of projector 2, in Figure 6, an image of Figure 4, or the depth-preference film, AD, is shown being projected.

It is seen in the former figure, Figure 5, that while the double-vision view, AC—BD, is completely exposed for projection in projector 1; the depth-preference print, AD, is just about to be exposed for projection in synchronizing projector 2.

Similarly it is seen in Figure 6, that when AD has been exposed for projection in projector 2, AC—BD has just been covered in synchronizing projector 1.

It is also understood that the finished stereoscopic print, as obtained at section 2, (e), above, can be projected alone upon the screen without the use of an alternating print.

I claim:

1. The depth-preference process of combining two stereoscopic views of a subject taken from separated viewpoints, this process consisting of, superposing the two views, one upon the other, eliminating all parts of objects in the foreground in each view which obstruct any part of the background of the other view, and superimposing the resulting partial views to make a single complete view in which no parts overlap.

2. The depth-preference process of combining for simultaneous optical projection related parts of two stereoscopic views of a subject taken from separated viewpoints, which comprises superposing the left-eye view on the right-eye view, over a strong light; painting out (or eroding) all parts in the upper film which obstruct any parts in the under film that represent greater depth into the scene, such obstructing parts being found exclusively on the right-hand side of all objects or parts of objects which have relief in the left-eye view; then superposing the right-eye view on the left-eye view in the same way and painting out (or eroding) all parts in that film which obstruct any parts in the under film that represent greater depth into the scene, such obstructing parts being found exclusively on the left-hand side of all objects or parts of objects which have relief in the right-eye view; then printing the remaining parts of the two views together on a single film.

3. The depth-preference film, being a film for optical, cinematographic projection, having on each frame superimposed right and left-eye photographic views of a scene, each of these two views showing only those parts which do not obstruct any parts in the other that represent greater depth into the scene, the film being characterized throughout by evidencing incomplete sections on the right-hand side, exclusively, of all objects or parts of objects which have relief in the superimposed photographs representing the left-eye views and on the left-hand side, exclusively, of all objects or parts of objects which have relief in the superimposed photographs representing the right-eye views.

4. The depth-preference method of projection of stereoscopic moving pictures, which consists of projecting from one projector superimposed right and left-eye views of the same scene, and with another projector alternatingly projecting corrected stereoscopic views of the same scene in which the obstructing parts of objects in the foregrounds of the superimposed right and left-eye views have been eliminated in favor of the deeper parts representing greater distances into the scene; of projecting the first film so as to expose the light once only for each frame for a shorter time than is usual; of projecting the second film immediately after, and leaving as long an interval of darkness after these two frames as is consistent with flickerless vision.

MORRIS J. SPIVACK.